(12) United States Patent
Odachi et al.

(10) Patent No.: US 6,711,037 B2
(45) Date of Patent: Mar. 23, 2004

(54) POWER SUPPLY APPARATUS

(75) Inventors: Yasuharu Odachi, Aichi-ken (JP); Yoshiaki Ishihara, Aichi-ken (JP); Seiki Sakata, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/167,537

(22) Filed: Jun. 12, 2002

(65) Prior Publication Data

US 2002/0191423 A1 Dec. 19, 2002

(30) Foreign Application Priority Data

Jun. 13, 2001 (JP) ......................................... 2001-178063

(51) Int. Cl.[7] .......................... H02M 5/42; H02M 7/5387
(52) U.S. Cl. .......................................... 363/98; 363/132
(58) Field of Search ............................. 363/37, 39, 41, 363/98, 132, 95, 135, 131

(56) References Cited

U.S. PATENT DOCUMENTS 3,609,507 A * 9/1971 Beek ............................. 363/41
4,099,225 A * 7/1978 Nygaard ........................ 363/98
4,131,936 A * 12/1978 Gemp ........................... 363/43

FOREIGN PATENT DOCUMENTS

| JP | 10-337047 | 12/1998 | ........ H20M/7/5387 |
| JP | 10-337087 | 12/1998 | ............ H02P/7/63 |
| JP | 2000-308368 | 11/2000 | ........ H02M/7/5387 |

* cited by examiner

Primary Examiner—Rajnikant B. Patel
(74) Attorney, Agent, or Firm—Morgan & Finnegan, LLP

(57) ABSTRACT

An inverter includes a plurality of transistors, generates a 3-phase AC voltage, and supplies it to a 3-phase AC motor. The voltage on the primary side of a transformer connected to the neutral point of the 3-phase AC motor is controlled by changing the phase difference of a drive signal of each phase supplied to the inverter through a phase difference circuit. Thus, the output voltage of the transformer can be set to a desired value by a power supply circuit with a simple configuration.

7 Claims, 8 Drawing Sheets

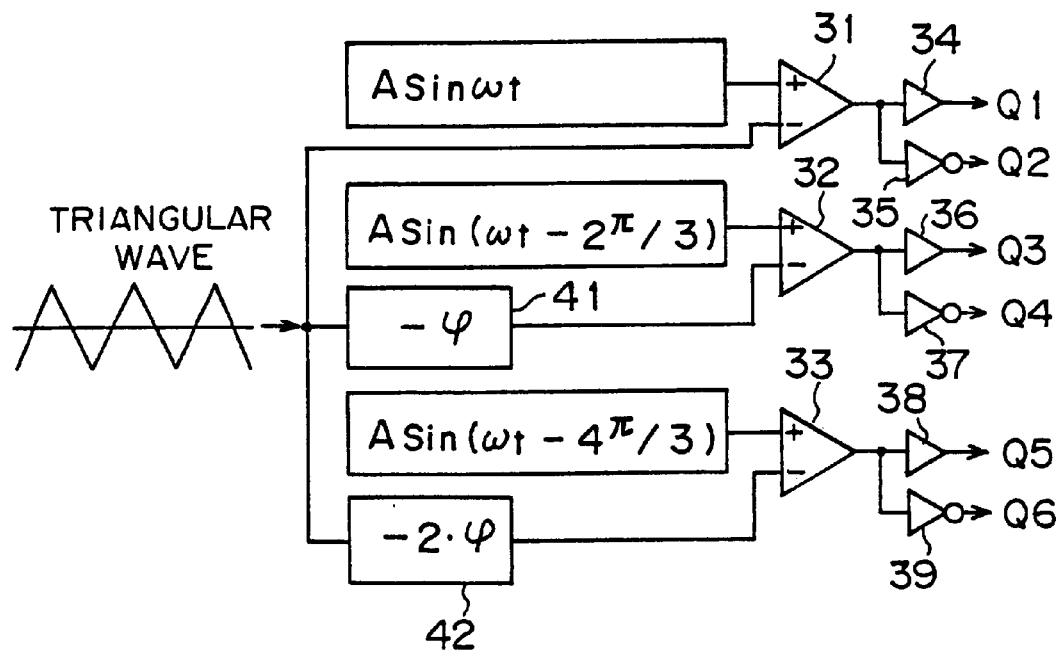
F I G. 3

POWER SUPPLY APPARATUS

BACKGROUND OF THE INVENTION

1. Field of the Invention

The present invention relates to a power supply apparatus for generating a plurality of output voltages from one power supply.

2. Description of the Related Art

An automobile is provided with an AC motor, etc. for driving a compressor for an airconditioner, and requires a power supply circuit for generating an AC voltage for driving the AC motor. It also requires a power supply circuit for providing a power supply for a lamp, car stereo, etc.

Recently, a hybrid car has been developed for practical use by combining a gasoline engine and an electric motor to solve the problem of air pollution by exhaust gases. The hybrid car also requires a power supply circuit for driving a motor for running the car.

Normally, since the voltage for a motor is different from the voltage for a lamp, etc., one battery voltage is converted into different AC voltages using two inverters, and the AC voltages are further converted into a DC voltage as necessary.

FIG. 1 shows the configuration of the conventional power supply circuit and AC motor. An inverter 11 is a DC/AC converter for converting a DC voltage of a battery 12 into a 3-phase AC voltage, and is configured by connecting in parallel 3 sets of two serially connected transistors. A U-phase coil of a 3-phase AC motor 13 is connected to the connection point of transistors Q1 and Q2, a V-phase coil of the 3-phase AC motor 13 is connected to the connection point of transistors Q3 and Q4. A W-phase coil is connected to the connection point of the transistors Q5 and Q6.

Furthermore, the voltage of the battery 12 is converted into a desired AC voltage by another inverter circuit 14, supplied to the primary side of a transformer 15, rectified by a rectifier circuit 16 connected to the secondary side, and supplied to a load.

The above mentioned conventional power supply circuit requires two inverters, that is, the inverter 11 for generating an AC voltage to be supplied to the 3-phase AC motor 13, and the inverter circuit 14 for generating the voltage to be supplied to the load of a lamp, etc. As a result, the configuration of the power supply circuit is complicated, thereby causing the problem of increased weight and higher cost.

SUMMARY OF THE INVENTION

The present invention aims at realizing a power supply apparatus capable of supplying a plurality of output voltages in a simple configuration.

According to an aspect of the present invention, the power supply apparatus includes: an AC voltage generation unit for generating a polyphase AC voltage; a transformer connected to the neutral point of windings of the AC motor supplied with the AC voltage by said AC voltage generation unit; and a control unit for determining the voltage on the primary side of the transformer by shifting the phase of the voltage of at least one phase of polypase AC voltage generated by the AC voltage generation unit.

According to the invention, by shifting the phase of the polyphase AC voltage, the output voltage of the transformer connected to the neutral point of the AC motor can be changed. Thus, for example, a desired voltage can be supplied to a load without a circuit for adjusting the output voltage on the secondary side of the transformer. Thus, since it is not necessary to provide an inverter circuit, etc. for generating a voltage to be supplied to a load, the configuration of the circuit of the power supply apparatus can be simplified.

In the above mentioned invention, the power supply apparatus includes a DC supply which connects to the input side of the AC voltage generation unit, wherein the AC voltage generation unit includes an inverter circuit which includes a plurality of semiconductor devices, and converts the output voltage of the DC supply into a 3-phase AC voltage.

In the above mentioned invention, one end of the coil on the primary side of the transformer can be connected to the neutral point while the other end can be connected to the earth of the DC supply through the capacitor.

With the configuration, the DC can be prevented from flowing into the transformer, and a smaller transformer can be realized using a small core.

In the above mentioned invention, one end of the coil on the primary side of the transformer can be connected to the neutral point through the capacitor while the other end can be directly connected to the earth of the DC supply.

BRIEF DESCRIPTION OF THE DRAWINGS

FIG. 3 shows the configuration of the control unit according to the first embodiment;

DESCRIPTION OF THE PREFERRED EMBODIMENTS

Figure 1:
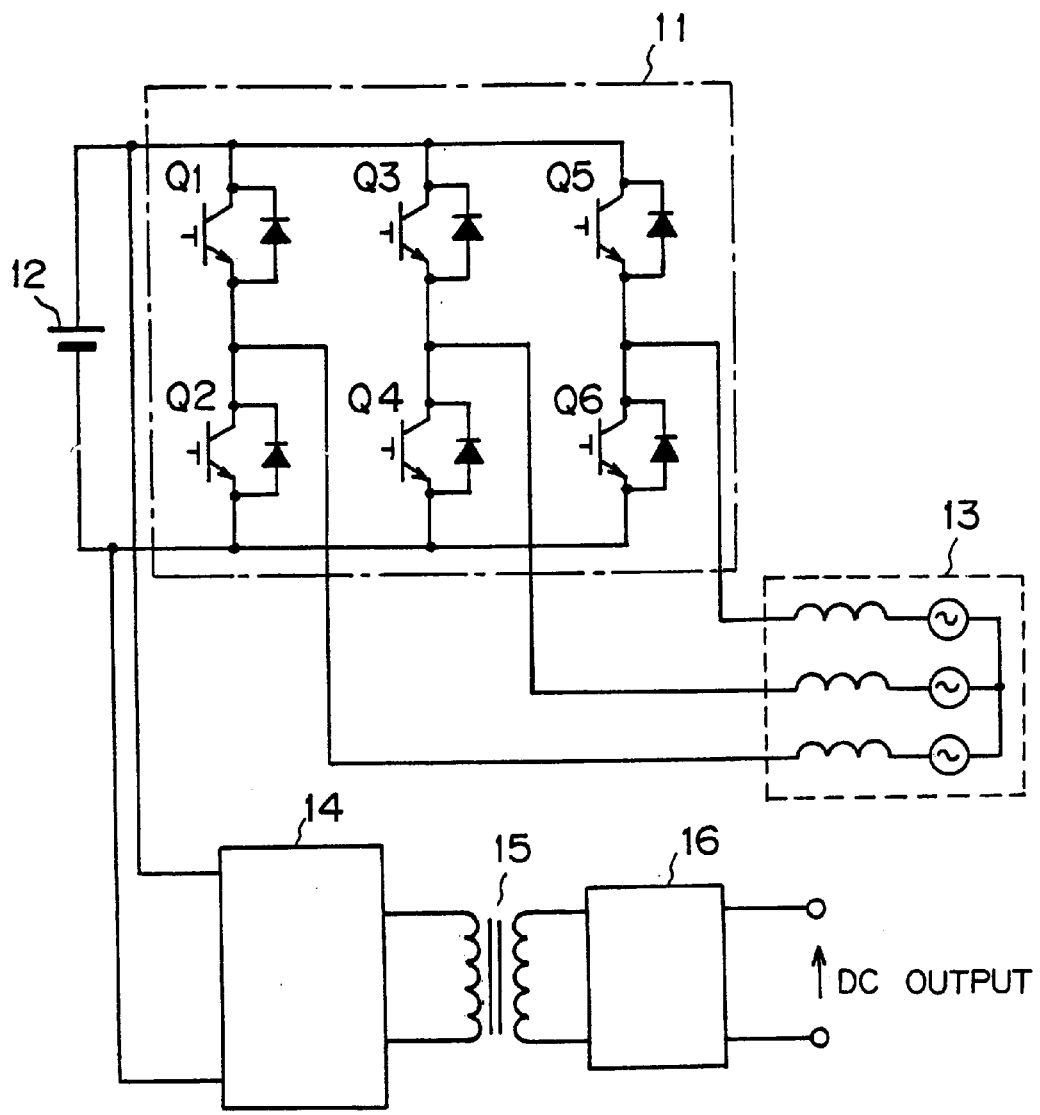
FIG. 1 shows the configuration of the conventional power supply circuit and AC motor.
Figure 2:
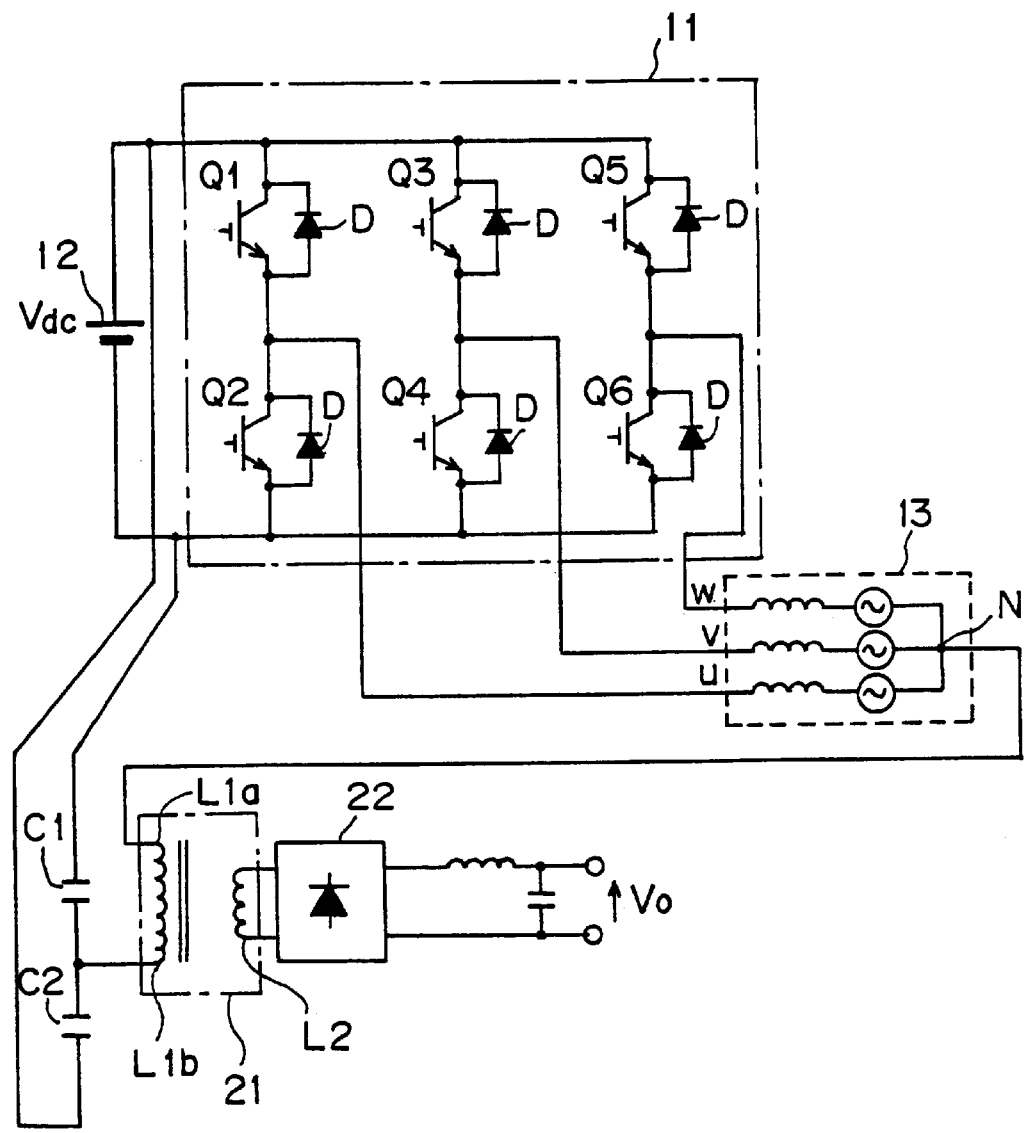
FIG. 2 shows the configuration of the power supply apparatus and the AC motor according to an embodiment of the present invention.

The embodiments of the present invention are described below by referring to the attached drawings. FIG. 2 shows the configuration of the power supply apparatus and the 3-phase AC motor according to the embodiment of the present invention.

In the inverter (AC voltage generation unit) 11, two serially connected transistors Q1 and Q2, Q3 and Q4, and Q5 and Q6 are connected parallel to the battery 12, and a diode D is connected between the collector and emitter of each of the transistors Q1 through Q6. The inverter 11 converts the DC voltage of the battery 12 into a 3-phase AC voltage, and supplies it to the 3-phase AC motor 13.

A U-phase voltage of a 3-phase AC voltage is supplied from the transistors Q1 and Q2. A V-phase voltage of a 3-phase AC voltage is supplied from the transistors Q3 and Q4. A W-phase voltage of a 3-phase AC voltage is supplied from the transistors Q5 and Q6.

The 3-phase AC motor 13 has a Y connection, and one end L1a of the primary side winding L1 of a transformer 21 is connected to the neutral point N of the AC motor 13, and the other L1b of the primary side winding L1 of the transformer 21 is connected to the connection point of the capacitors C1 and C2.

The capacitors C1 and C2 are serially connected, and capacitors C1 and C2 are connected parallel to the battery 12. Thus, the positive/negative currents flow through the transformer 21 by connecting the transformer 21 to the connection point of the capacitors C1 and C2, and the DC component can be cut off. Therefore, a small core can be used for the transformer 21, thereby realizing a smaller transformer 21.

A rectifier circuit 22 is connected to the secondary side winding L2 of the transformer 21, and the DC voltage rectified by the rectifier circuit 22 is supplied to a load such as a lamp, etc.

FIG. 3 shows the configuration of the control unit for generating a drive signal to be supplied to the transistors Q1 through Q6 of the inverter 11.

In FIG. 3, a triangular wave is a switching signal of the inverter 11. For example, it is a signal of a frequency of 10~20 kHz. A sine wave Asin ωt is a signal of a frequency of 50~100 Hz which is a driving frequency for the 3-phase AC motor 13.

The triangular wave signal is input as is to an inverse input terminal of a comparator 31, and the sine wave Asin ωt is input into the non-inverse input terminal. The output of the comparator 31 is output to the base of the transistor Q1 as is through a buffer 34, and simultaneously inverted by an inverter 35 and output to the base of the transistor Q2. That is, when a signal for turning one transistor Q1 ON is output from the comparator 31, then a signal for turning the other transistor Q2 OFF is output.

A signal obtained by shifting the phase of a triangular wave by $-\phi$ by a phase difference circuit 41 is input into the inverse input terminal of a comparator 32. A sine wave Asin(ωt$-2\pi/3$) having a phase difference of $2\pi/3$ from the sine wave Asin ωt is input into the non-inverse input terminal of the comparator 32. The output of the comparator 32 is output as is to the base of the transistor Q3 through a buffer 36, simultaneously inverted by an inverter 37, and output to the base of the transistor Q4.

A signal obtained by shifting the phase of the triangular wave by $-2\phi$ by a phase difference circuit 42 is input into the inverse input terminal of the comparator 33. A sine wave Asin(ωt$-4\pi/3$) having a phase difference of $4\pi/3$ from the sine wave Asin ωt is input into the non-inverse input terminal of the comparator 33. The output of the comparator 33 is output as is to the base of the transistor Q5 through a buffer 38, simultaneously inverted by an inverter 39, and output to the base of the transistor Q6.

That is, a drive signal whose phase is shifted by $\phi$ from the drive signal of the transistors Q1 and Q2 in addition to the phase difference of $2\pi/3$ between the phases of the 3-phase AC voltage is supplied to the base of the transistors Q3 and Q4. Similarly, a drive signal whose phase is shifted by $2\phi$ in addition to the phase difference of $2\pi/3$ between the phases of the 3-phase AC voltage is supplied to the base of the transistors Q5 and Q6.

When the inverter 11 as shown in FIG. 2 converts a DC voltage into a 3-phase AC voltage, the switching noise, etc. is superposed on the current of each phase supplied to the 3-phase AC motor 13, and the potential at the neutral point N of the 3-phase AC motor 13 includes the ripple of the switching frequency of the inverter 11.

The transformer 21 shown in FIG. 2 extracts the fluctuation of the voltage by the ripple of the switching frequency at the neutral point N.

The control circuit shown in FIG. 3 shifts the phase of the triangular wave of the drive signal supplied to the transistors Q3 and Q4 outputting the V-phase AC voltage from the triangular wave of the U-phase drive signal by $\phi$, and shifts the phase of the triangular wave of the drive signal supplied to the transistors Q5 and Q6 outputting the W-phase AC voltage from the triangular wave of the U-phase drive signal by $2\phi$. Thus, the voltage at the neutral point N can be changed by shifting the phase of the triangular wave of each phase of the 3-phase AC voltage by $\phi$ (variable).

Figure 4:
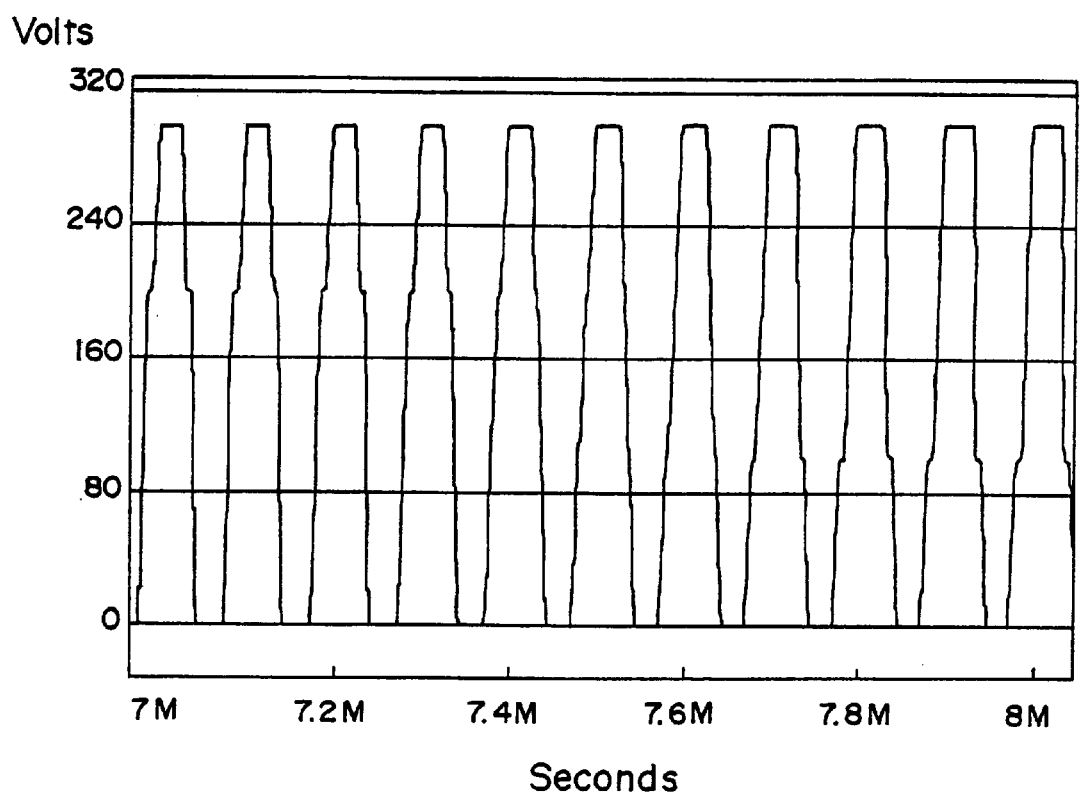
FIG. 4 shows the voltage of the neutral point.
Figure 5:
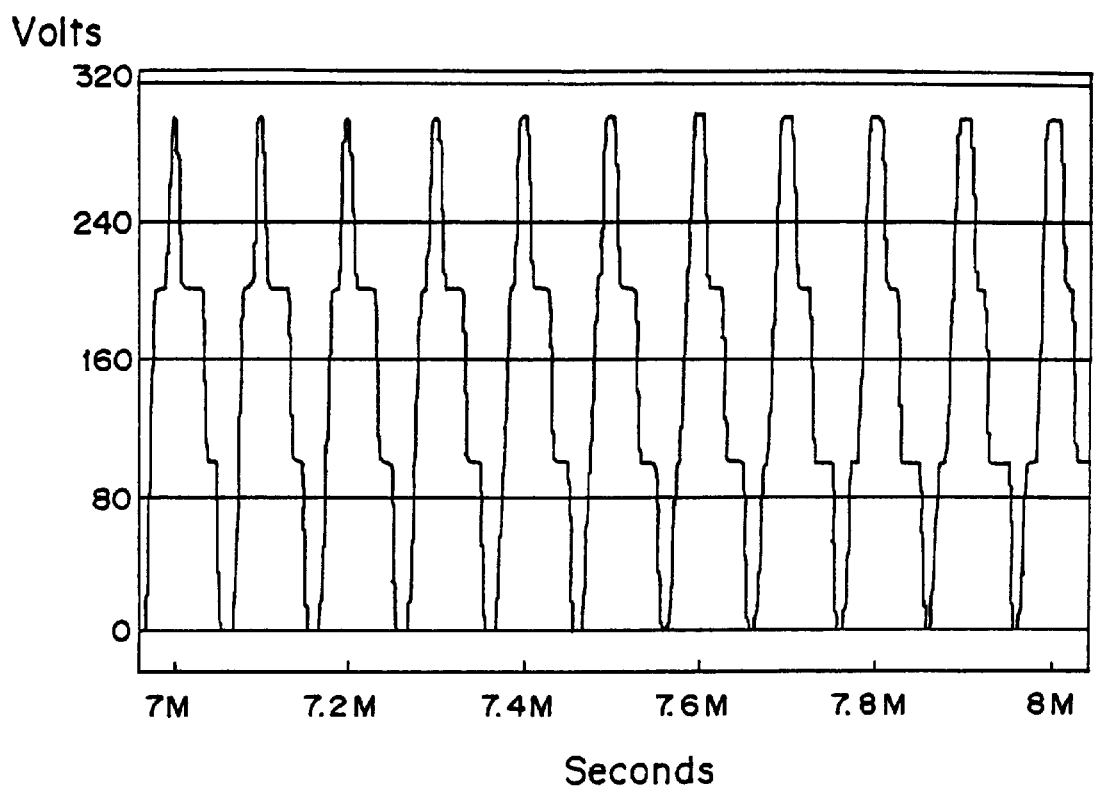
FIG. 5 shows the voltage of the neutral point.
Figure 6:
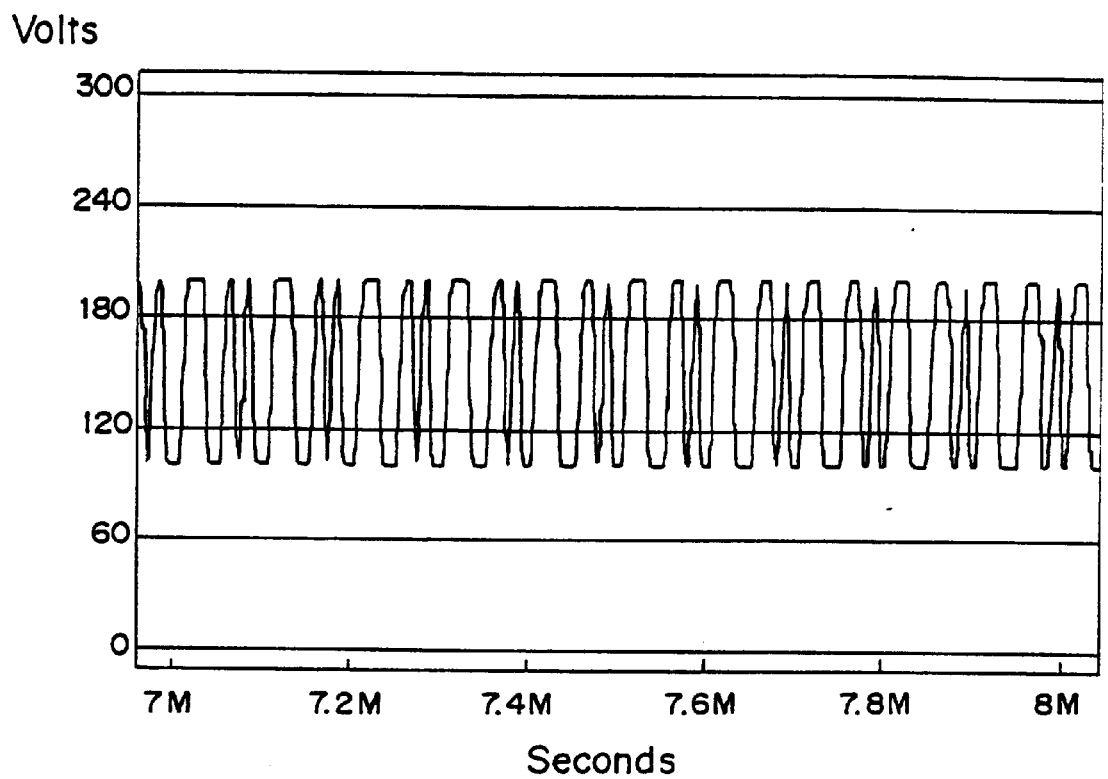
FIG. 6 shows the voltage of the neutral point.

FIGS. 4 through 6 show the voltage waveform at the neutral point N when the phase difference $\phi$ is changed. FIG. 4 shows the voltage at the neutral point N when the phase difference $\phi=0$. FIG. 5 shows the voltage at the neutral point N when $\phi=\pi/3$. FIG. 6 shows the voltage at the neutral point N when the phase difference $\phi=2\pi/3$.

That is, the voltage at the neutral point N of the 3-phase AC motor 13 can be changed by shifting the phase of the drive signal to be supplied to the transistors Q1 through Q6 outputting the voltage of each phase of the inverter 11 which generates a 3-phase AC voltage. Then, the voltage at the neutral point N is taken and rectified by the transformer 21, thereby supplying a DC voltage of a desired value to a load.

Figure 7:
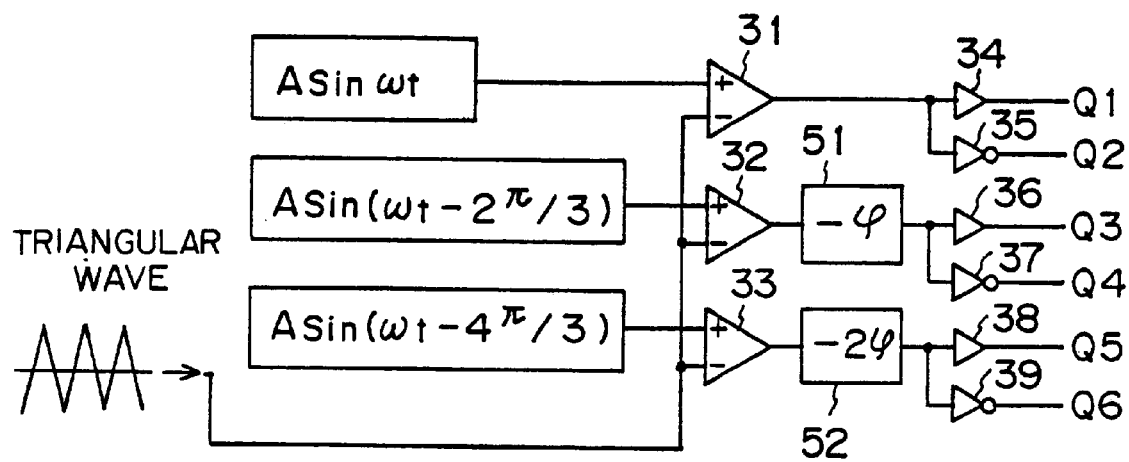
FIG. 7 shows the configuration of the control unit according to the second embodiment of the present invention.

FIG. 7 shows the configuration of the control circuit according to the second embodiment of the present invention. In the following explanation of the embodiment, the portion also appearing in the control circuit shown in FIG. 2 is assigned the same reference numeral, and the explanation is omitted here.

According to the second embodiment of the present invention, the phase of a triangular wave is not shifted, but a phase difference is directly given to a drive signal to be supplied to the transistors Q1 through Q6.

Therefore, a phase difference circuit 51 for assigning the phase difference $\phi$ is provided on the output side of the comparator 32, and a signal assigned the phase difference $\phi$ to the output signal of the comparator 32 is output to the buffer 36 and the inverter 37. The drive signal having the phase difference $\phi$ is output to the base of the transistors Q3 and Q4. Similarly, a phase difference circuit 52 for assigning the phase difference 2$\phi$ is provided on the output side of the comparator 33, and a signal assigned the phase difference 2$\phi$ to the output signal of the comparator 33 is output to the buffer 38 and the inverter 39. The drive signal having the phase difference 2$\phi$ is output to the base of the transistors Q5 and Q6.

According to the second embodiment as well as the first embodiment of the present invention, by shifting respectively by $\phi$ and 2$\phi$ (variable) the phases of the drive signals to be supplied to the bases of the transistors Q3 and Q4 and the transistors Q5 and Q6 for generating the AC voltage of the V-phase and W-phase, the voltage at the neutral point N of the 3-phase AC motor 13 can be changed. Therefore, the voltage at the neutral point N can be taken by the transformer 21, thereby supplying a desired voltage to a load.

Figure 8:
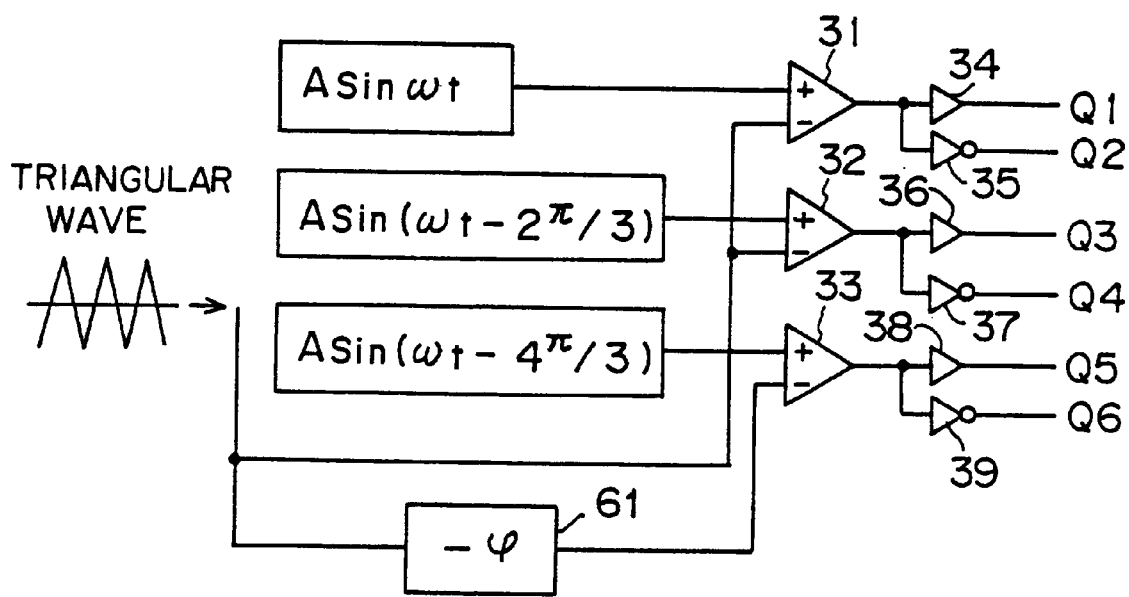
FIG. 8 shows the configuration of the control unit according to the third embodiment of the present invention.

FIG. 8 shows the configuration of the control circuit according to the third embodiment of the present invention. The embodiment shows an example of a phase difference circuit 61 assigning the phase difference $\phi$ to a triangular wave provided for one phase (for example, a W-phase)

A triangular wave is input into an inverse input terminal of the comparator 33 by shifting the phase by $-\phi$ in the phase difference circuit 61. Then, the comparator 33 outputs a signal whose phase is shifted by about $\phi$ from the triangular wave of the U-phase drive signal, and the signal is output as is or inverted to the base of the transistor Q5 or Q6.

According to the third embodiment of the present invention, a drive signal having the triangular wave whose phase is shifted by φ after adding the phase difference φ(4π/3) of the 3-phase AC voltage to the base of the transistors Q5 and Q6 outputting a W-phase DC voltage can be supplied. Therefore, by changing the phase difference φ, the voltage at the neutral point N of the 3-phase AC motor 13 is changed, and the voltage at the primary side of the transformer 21 can be set to a desired voltage.

The present invention is not limited to the above mentioned configuration, but can be configured as follows.

(a) The other end of the transformer connected to the neutral point of the motor is not always connected to the connection point of the capacitor connected parallel to the DC supply, but can be directly connected to the earth of the DC supply, or to the earth through a passive element such as capacitor, a resistor, etc. oran active element.

(b) The control circuit for generating a drive signal is not limited to a circuit for generating a signal by comparing a triangular wave according to the above mentioned embodiment with a sine wave by a comparator, but can use a rectangular wave, a saw-shaped wave, etc., and can be configured including a transistor, a resistor, etc. other than the comparator.

(c) The method for shifting one or a plurality of phases of a polyphase AC is not limited to a method of setting each phase difference φ to a multiple such as φ, 2φ, etc., but can be set independent of the phase difference of each phase.

(d) Regardless of the method of setting a phase difference to a specific value and determining a voltage at the neutral point N, a phase difference can be freely set to vary the voltage to be supplied to a load.

(e) The AC voltage generation unit (inverter 11) is configured by, but not limited to, connecting plural sets of two serially connected transistors in parallel.

(f) A power supply is not limited to an accumulator such as a battery, etc., using chemical reaction, but can be a DC voltage obtained from an AC, and also can be an AC supply.

(g) The AC voltage generation unit is not limited to a circuit for generating a 3-phase AC voltage, but can be a circuit for generating a polyphase AC voltage depending on the number of phases of an AC motor.

(h) The present invention is applied to any device or product, not limited to an automobile, which uses a power supply apparatus for generating a plurality of voltages including an AC voltage. Especially, it is effective when a smaller and lighter device is required.

The above mentioned embodiment of the present invention can change a voltage taken at the neutral point N of an AC motor into a desired value. For example, a desired voltage can be supplied without providing a circuit for adjusting an output voltage on the secondary side of a transformer, thereby simplifying the configuration of the power supply apparatus.

What is claimed is:

1. A power supply apparatus, comprising:

an AC voltage generation unit generating a polyphase AC voltage;

a transformer connected to a neutral point of a windings of an AC motor which said AC voltage generation unit supplies with AC voltage, supplying loads other than the AC motor with voltages; and a control unit for determining a voltage at the neutral point by shifting a phase of a voltage of at least one phase of the polyphase AC voltage that said AC voltage generation unit generates and causing said transformer to supply the loads other than the AC motor with voltages.

2. The apparatus according to claim 1, further comprising a DC supply which connects to the input side of the AC voltage generation unit, wherein said AC voltage generation unit comprises an inverter circuit which comprises a plurality of semiconductor devices, and converts an output voltage of the DC supply into a 3-phase AC voltage.

3. The apparatus according to claim 1, wherein:

said AC voltage generation unit comprises an inverter circuit for generating a polyphase AC voltage by switching a plurality of semiconductor devices; and said control unit comprises a phase difference circuit for shifting at least one phase of a drive signal of each phase for turning ON/OFF the plurality of semiconductor devices of said inverter circuit.

4. The apparatus according to claim 3, wherein said control unit comprises:

a phase difference circuit for assigning predetermined phase difference to a triangular wave, and a voltage comparator for comparing a sine wave signal with a triangular wave assigned a predetermined phase difference by the phase difference circuit, and outputting a comparison result to the semiconductor devices to drive a polyphase AC motor.

5. The apparatus according to claim 4, wherein a frequency of the triangular wave is 10~20 kHz, and a frequency of the sine wave is 50~100 Hz.

6. The apparatus according to claim 1, wherein one end of a coil on a primary side of the transformer is connected to the neutral point of the windings of the AC motor, the other end of the coil is connected to an earth of the DC supply through a capacitor.

7. The apparatus according to claim 1, wherein the voltage on a primary side of the transformer corresponds to the amount of shifting the phase.

* * * * *

UNITED STATES PATENT AND TRADEMARK OFFICE
CERTIFICATE OF CORRECTION

PATENT NO. : 6,711,037 B2
DATED : March 23, 2004
INVENTOR(S) : Odachi et al.

It is certified that error appears in the above-identified patent and that said Letters Patent is hereby corrected as shown below:

Column 4,
Line 39, please delete "difference 20" and insert therefore -- difference 2φ --;

Column 6,
Line 5, please delete "windings" and insert therefore -- winding, --.

Signed and Sealed this

Fifteenth Day of February, 2005

JON W. DUDAS
*Director of the United States Patent and Trademark Office*